United States Patent
Ezell et al.

(10) Patent No.: US 10,148,522 B2
(45) Date of Patent: Dec. 4, 2018

(54) EXTENSION OF AUTHORIZATION FRAMEWORK

(71) Applicant: Avaya Inc., Santa Clara, CA (US)

(72) Inventors: Joel M. Ezell, Broomfield, CO (US); Gordon Brunson, Broomfield, CO (US); Geoff Baskwill, Almonte (CA); Seung Bong (Stephen) Han, Tracy, CA (US)

(73) Assignee: Avaya Inc., Santa Clara, CA (US)

( * ) Notice: Subject to any disclaimer, the term of this patent is extended or adjusted under 35 U.S.C. 154(b) by 224 days.

(21) Appl. No.: 14/694,400

(22) Filed: Apr. 23, 2015

(65) Prior Publication Data

US 2016/0269388 A1    Sep. 15, 2016

Related U.S. Application Data (60) Provisional application No. 62/130,408, filed on Mar. 9, 2015.

(51) Int. Cl.
H04L 29/06    (2006.01)
H04L 12/24    (2006.01)
(Continued)

(52) U.S. Cl.
CPC ............ *H04L 41/18* (2013.01); *H04L 63/083* (2013.01); *H04L 63/10* (2013.01);
(Continued)

(58) Field of Classification Search
CPC ....... H04L 41/18; H04L 63/083; H04L 63/10; H04M 3/42212; H04M 3/42042; H04M 2250/60
See application file for complete search history.

(56) References Cited

U.S. PATENT DOCUMENTS 6,885,739 B2    4/2005    Cannon et al.
7,315,614 B2    1/2008    Bedingfield, Sr. et al.
(Continued)

FOREIGN PATENT DOCUMENTS

WO    WO 2013056674    4/2013
WO    WO 2013107403    7/2013

OTHER PUBLICATIONS

"Avaya Aura® Application Server 5300," Avaya Inc., 2016, retrieved from http://www.avaya.com/usa/product/avaya-aura-application-server-5300/#, 9 pages.
(Continued)

*Primary Examiner* — Mohammed Waliullah
(74) *Attorney, Agent, or Firm* — Sheridan Ross P.C.

(57) ABSTRACT

To provide better administrative access control for allowing access to network applications, an authorization framework is extended by dynamically adding administrative access control to the authorization framework. For example, the authorization framework can be extended by adding a plug-in to the authorization framework. The authorization framework manages the access control by generating tokens. For example, a token may be a digital certificate. The tokens define what access control an application, such as a client application has when accessing the network application. The tokens are based on the dynamically added administrative access control. When a request for a token is securely received, the authorization framework generates a token that identifies if the application (e.g., the client application) is allowed or not allowed to access the network application. The token is then used by the application to access the network application.

20 Claims, 5 Drawing Sheets

(51) Int. Cl.
*H04M 3/42* (2006.01)
*H04M 3/54* (2006.01)

(52) U.S. Cl.
CPC ... *H04M 3/42042* (2013.01); *H04M 3/42212* (2013.01); *H04M 3/42263* (2013.01); *H04M 3/54* (2013.01); *H04M 2250/60* (2013.01)

(56) References Cited

U.S. PATENT DOCUMENTS

| 7,493,110 | B2 | 2/2009 | Jiang |
| 8,204,192 | B1 | 6/2012 | Suhail et al. |
| 8,955,037 | B2* | 2/2015 | Srinivasan ............ G06F 21/604 726/1 |
| 2004/0024764 | A1* | 2/2004 | Hsu ........................ G06F 21/31 |
| 2005/0010528 | A1* | 1/2005 | Pelz ....................... G06F 21/604 705/51 |
| 2006/0067498 | A1 | 3/2006 | Plas et al. |
| 2007/0185875 | A1* | 8/2007 | Chang ................. G06F 21/6218 |
| 2008/0307506 | A1* | 12/2008 | Saldhana .............. H04L 63/105 726/4 |
| 2011/0293084 | A1 | 12/2011 | Bhagavatula et al. |
| 2013/0122870 | A1* | 5/2013 | Hegde ................. H04M 1/6505 455/412.2 |
| 2015/0222744 | A1 | 8/2015 | Azim et al. |
| 2016/0259936 | A1* | 9/2016 | Mukherjee ............. G06F 21/45 |
| 2016/0269521 | A1 | 9/2016 | Mendiratta et al. |

OTHER PUBLICATIONS

"Local and Remote Notification Programming Guide Apple Push Notification Service" Apple, 2015, retrieved from https://developer.apple.com/library/ios/documentation/NetworkingInternet/Conceptual/RemoteNotificationsPG/Chapters/ApplePushService.html, 6 pages.
Official Action for U.S. Appl. No. 14/727,565, dated May 9, 2016, 12 pages.
Notice of Allowance for U.S. Appl. No. 14/727,565, dated Oct. 28, 2016, 5 pages.

* cited by examiner

FIG. 5

EXTENSION OF AUTHORIZATION FRAMEWORK

CROSS REFERENCE TO RELATED APPLICATIONS

This application claims the benefit under 35 U.S.C. § 119(e) of U.S. Provisional Application No. 62/130,408, filed Mar. 9, 2015, entitled "OAuth2 Reference Architecture," the entire disclosure of which is incorporated herein by reference.

TECHNICAL FIELD

The systems and methods disclosed herein relate to administration systems and in particular to network administration systems.

BACKGROUND

In early Private Branch Exchange (PBX) development, an administrator controlled all aspects of security and access control. Over the last few decades, the PBX model of only allowing administrative control has started to change. Today, control of certain PBX features has been extended to telephones, gateways, data networks, feature servers, and other equipment. When control of these features becomes more distributed, the question arises as to what elements can be trusted. Instead of having a single trusted administrator that controls every feature, now there may be many different elements that have the ability to administer security and access control for various features. The current approach has been to consider whether each element can be trusted with full administrative privileges. In many cases, granting full administrative privileges to all aspects of a communication feature may not be acceptable. In addition, with the distributed architecture, it may be difficult to easily add administrative access for new elements that may request access to the PBX features without making software modifications.

To develop a common authorization service, standards, such as Open Standard Authorization (OAuth) provides a common framework that allows a user to control access to applications. However, OAuth does not address a corporate environment where further access control is desired, such as administrative control.

SUMMARY

Systems and methods are provided to solve these and other problems and disadvantages of the prior art. To provide better administrative access control for allowing access to network applications, an authorization framework is extended by dynamically adding administrative access control to the authorization framework. For example, the authorization framework can be extended by adding a plug-in to the authorization framework. The authorization framework manages the access control by generating tokens. For example, a token may be a digital certificate. The tokens define what access control an application, such as a client application has when accessing the network application. The tokens are based on the dynamically added administrative access control. When a request for a token is securely received, the authorization framework generates a token that identifies if the application (e.g., the client application) is allowed or not allowed to access the network application. The token is then used by the application to access the network application.

DETAILED DESCRIPTION

Figure 1:
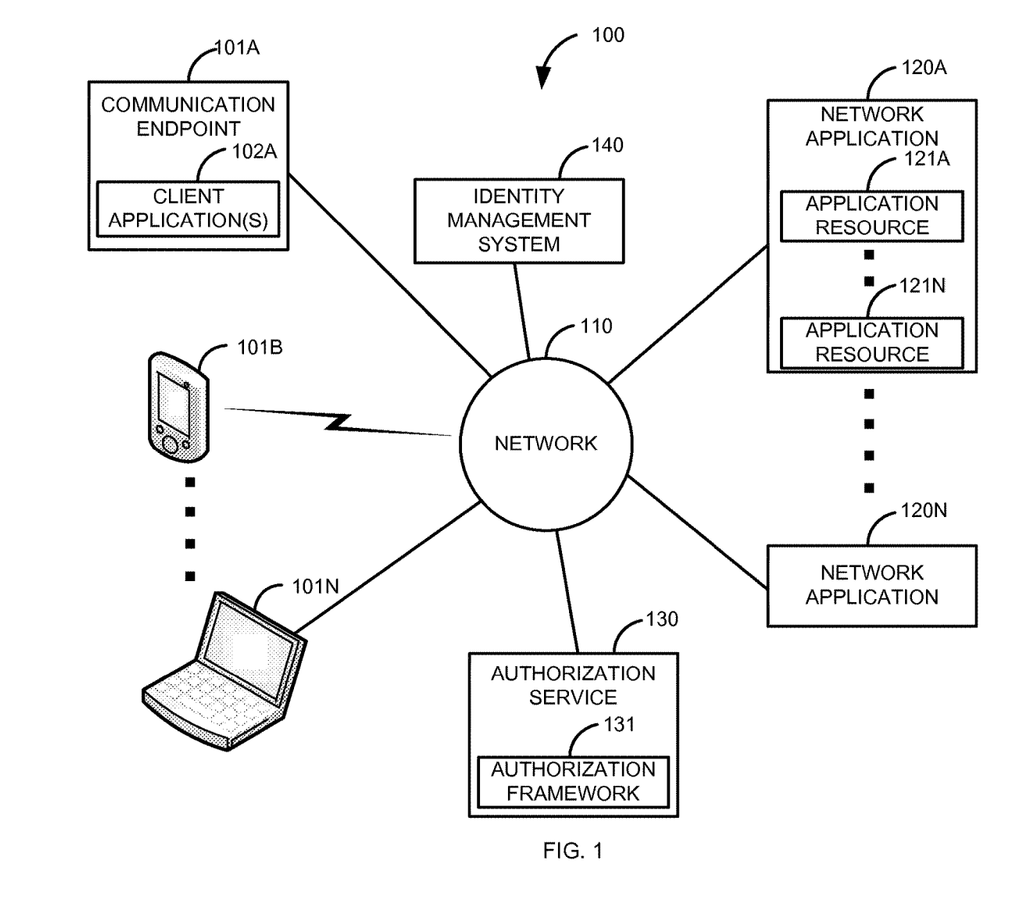
FIG. 1 is a block diagram of a first illustrative system for extending an authorization framework.

FIG. 1 is a block diagram of a first illustrative system 100 for extending an authorization framework 131. The first illustrative system 100 comprises communication endpoints 101A-101N, a network 110, network applications 120A-120N, an authorization service 130, and an identity management system 140.

The communication endpoint 101 can be or may include any device that is an endpoint of a communication, such as a Personal Computer (PC), a telephone, a video phone, a cellular telephone, a Personal Digital Assistant (PDA), a tablet device, a notebook device, a pager, a smart phone, a lap-top computer, a FAX machine, a voice mail system, and/or the like. As shown in FIG. 1, any number of communication endpoints 101A-101N may be connected to the network 110, including only a single communication endpoint 101.

The communication endpoint 101A further comprises a client application 102A. A client application 102 can be any hardware/software that can access the network applications 120A-120N. For example, the client application 102 may be a browser, a telephony application, an email application, an Instant Messaging (IM) application, a video application, a contact center application, a Virtual Private Network (VPN) application, a web application, a social media application, a virtual reality application, a gaming application, and/or the like. Although not shown, the communication endpoints 101B-101N may also include the client application 102.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, web protocols, and/or the like. Thus, the network 110 is an electronic communication network configured to carry messages via packets and/or circuit switched communications.

The network applications 120A-120N can be or may include any network application 120 that can provide services on the network 110. For example, the network application 120 may be a telephony application, an email application, an IM application, a text messaging application, a video application, a conferencing application, a multimedia application, a VPN application, a web application, a social media application, a social network application, a client application 102, a gaming application, a virtual reality application, and/or the like. Any number of network applications 120A-120N may be connected to the network 110, including only a single network application 120. As shown in FIG. 1, the network applications 120A-120N are on separate communication devices, such as a server. However, in some embodiments, a communication device may include multiple network applications 120.

Access control for each network application 120A-120N can be controlled separately. For example, the network application 120A may have different access privileges than the network application 120N. As discussed herein and in the claims, an application 120 may also be considered an application resource 121.

The network application 120A further comprises application resources 121A-121N. A network application 120 may or may not have application resources 121. For example the network application 120N does not include any application resources 121.

An application resource 121 is a specific resource of the network application 120 that can be controlled individually. For example, a conferencing application may have a video conferencing resource, a voice conferencing resource, and a recording resource. An administrator may only grant access to a specific user (i.e., a client application 102 of moderator of the conference) for the recording resource, while all users have been granted access to the video and audio conferencing resources.

Access control for the network application 120A may override access control for all application resources 121A-121N. For example, an administrator may deny access for a specific user to the network application 120A. If access is denied for the specific user to the network application 120, access to the individual application resources 121 is also denied. Alternatively, if access is granted to the application 120A, individual control to individual application resources 121A-121N may be controlled individually by an administrator.

The authorization service 130 can be or may include any hardware/software that can provide authorization services for the network applications 120A-120N/application resources 121A-120N. The authorization service 130 further comprises an authorization framework 131. The authorization framework 131 allows users and administrators to control access to the network applications 120. For example, the authorization framework 131 may be based on an open standard authorization framework 131, such as OAuth.

The identity management system 140 can be or may include any hardware/software that can manage authentication of a user. The identity management system 140 may be an identity management system for a specific enterprise, domain, and the like. The identity management system 140 may be a third party authentication service. For example, the identify management system 140 may be an certificate authority, such as, DigiCert™, GlobalSign™, Verisign™, Comodo™, and the like.

In FIG. 1, the identity management system 140 and the authorization service 130 are shown on separate communication devices. However, in some embodiments, the identity management system 140 and the authorization service 131 may be located on the same communication device.

Figure 2:
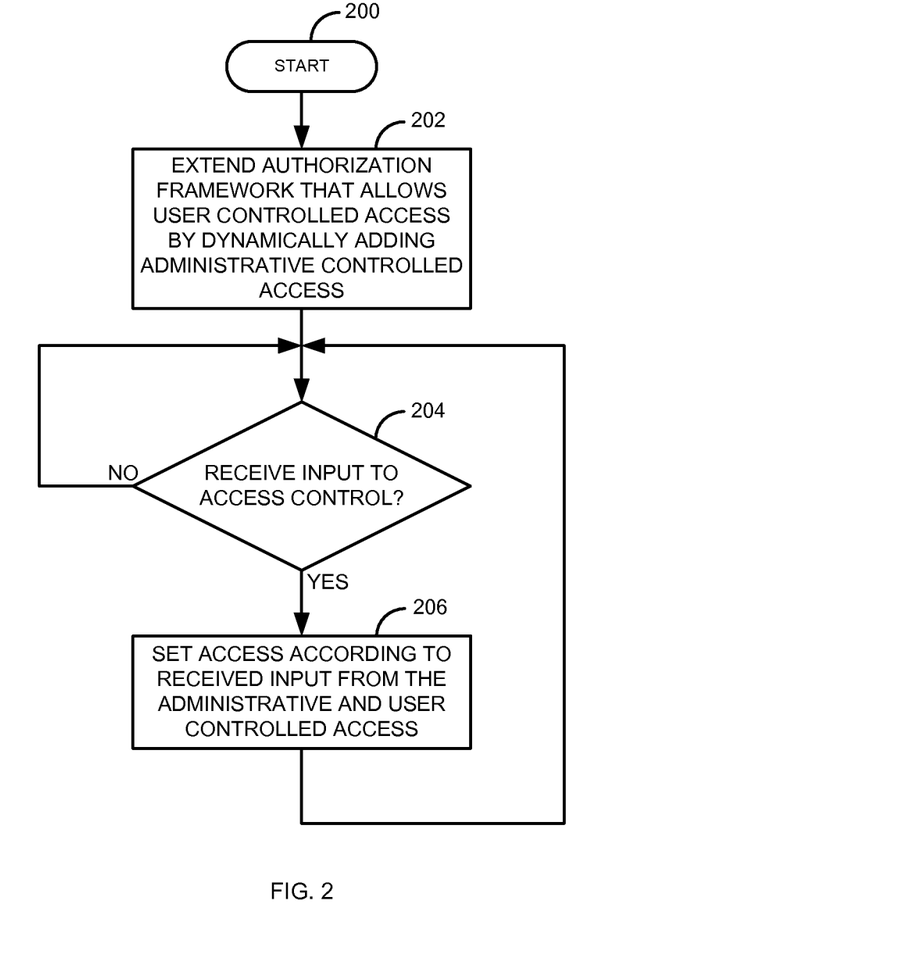
FIG. 2 is a flow diagram of a process for extending an authorization framework.

FIG. 2 is a flow diagram of a process for extending an authorization framework 131. Illustratively, the communication endpoints 101A-101N, the client application(s) 102, the network applications 120A-120N, the application resources 121A-121N, the authorization service 130, the authorization framework 131, and the identity management system 140 are stored-program-controlled entities, such as a computer or processor, which performs the method of FIGS. 2-5 and the processes described herein by executing program instructions stored in a non-transitory computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The authorization service 130 extends the authorization framework 131 by dynamically adding administrative access control to the authorization framework 131 in step 202. The authorization framework 131 initially only has user access control. Extension of the authorization framework 131 can be accomplished in various ways. For example, extension of the authorization framework 131 can be accomplished by installing a plug-in to the authorization framework 131. The extension of the authorization framework 131 may extended by a local or remote download.

Once the authorization framework 131 has been extended in step 202, the authorization framework 131 can receive input to control access (user and/or administrative) in step 204. For example, an administrator may provide the input from an administrative terminal that has access to the authorization framework 131. If no input is received in step 204, the process repeats step 204. Otherwise, if the input for access control has been received in step 204, the authorization framework 131 sets access according to the received input from the administrator and/or user controlled access in step 206 and the process goes back to step 204. The access control can be defined for a user (e.g., a client application 102 and/or another network application 120).

For example, an administrator and/or user may set access control of a first network application 120 to access a second network application 120 or application resource 131 using the authorization framework 131. An administrator and/or user may set access control for a user to dynamically decide when a network application 120 or application resource 131 may be accessed by another network application 120. For example, a user may be asked in a pop-up window whether to allow his secretary to have access to the user's network FAX machine. An administrator may grant access for a network application 120 or application resource 131, for an individual user, for an individual network application 120, for an individual application resource 121, for a group of users (e.g., all users), for a group of network applications 120, for a group of application resources 121, for a combination of these, and the like.

Figure 3:
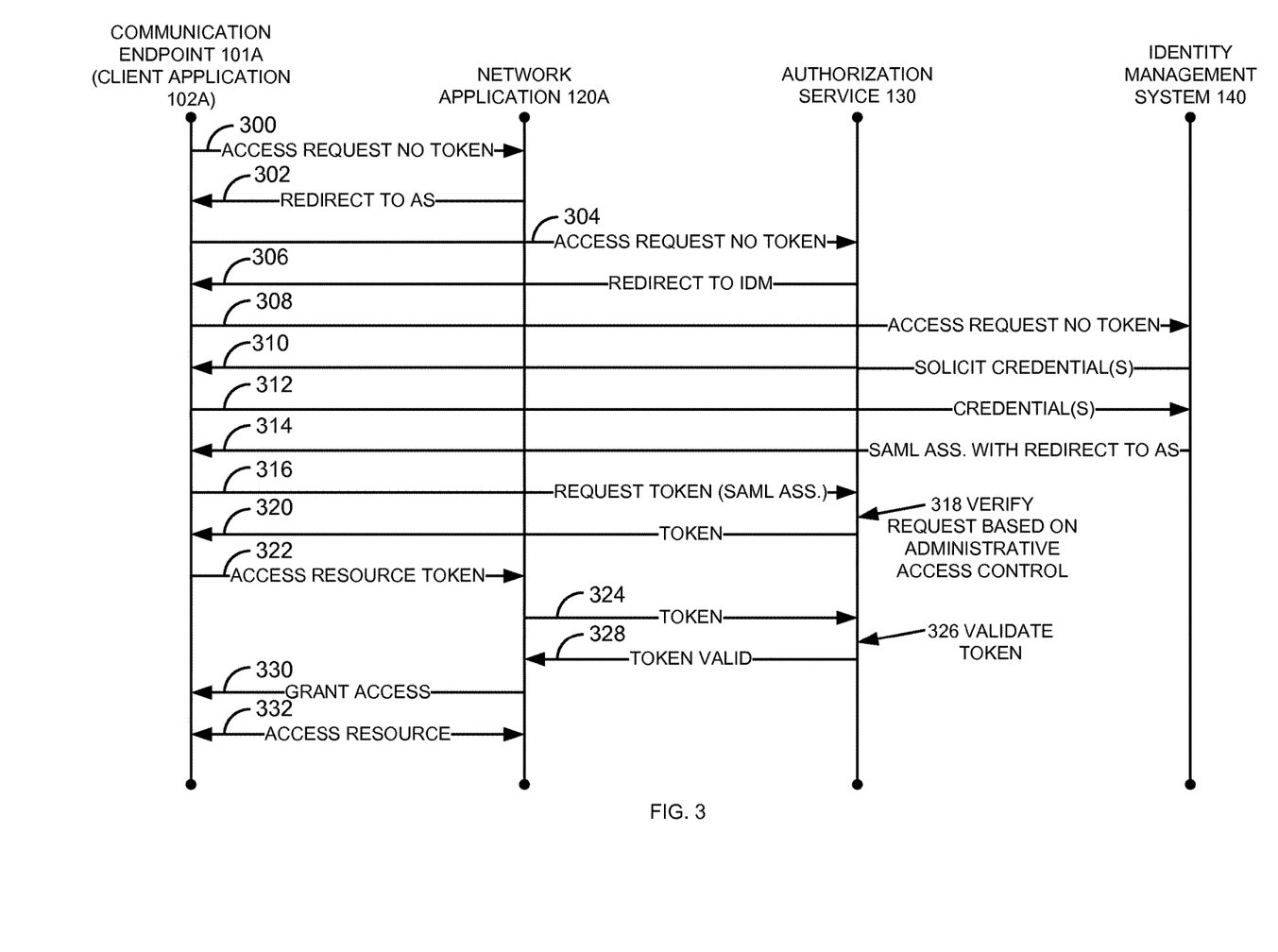
FIG. 3 is a flow diagram of a process for granting a client application access to a network application.

FIG. 3 is a flow diagram of a process for granting a client application 102 access to a network application 120. The process starts in step 300 when the client application 102A (e.g., a browser) sends an access request that does not include a token to the network application 120A. A token is a credential, such as a digital certificate that the network application 120A uses to confirm that the client application 102 has access privileges to the network application 120A. If a token is necessary to access the network application 120A in step 300, the network application 120A sends, in step 302, a redirect message to the client application 102A redirecting the request of step 300 to the authorization service 130.

In response to the redirect message of step 302, the client application 102A sends the access request without the token to the authorization service 130 in step 304. In this example, since the request is for user access from the client application 102A, the authorization service 130 sends, in step 306, a redirect message that redirects the message of step 304

(which was initially sent in step 300), to the identity management system 140. The purpose of redirecting the message of step 304 is to separate identity management of a user from the authorization service 130. This way the identity management system 140 can provide a single place for a user (and all users) to be authenticated regardless of what network resource 120 is being accessed.

In response to receiving the redirect message of step 306, the client application 102A sends, in step 308, the access request (of step 304) to the identity management system 140. In response to receiving the access request of step 308, the identity management system 140 sends a request to solicit a credential to the client application 102A in step 310. A credential may be any type of credential(s) that may be used to determine the identity of a user, such as a user name, a password, a digital certificate, and/or the like. After getting the credential(s) from the user, the client application 102A sends the credential(s) to the identity management system 140 in step 312.

In response to verifying the credentials (e.g., confirming that the user provided the correct user name and password), the identity management system 140 sends, in step 314, a redirect message that includes a Security Assertion Markup Language (SAML) assertion. The redirect message of step 314 redirects the message of step 314 to the authorization service 130. In response to receiving the redirect message with the SAML assertion in step 314, the client application 102A sends a token request with the SAML assertion to the authorization service 130 in step 316.

The authorization service 130 verifies what specific access control the application has in step 318. In response to verifying what access control the application has in step 318, the authorization service 130 generates a token that is based on the specific access control of the user in application 318. The access control for the application was defined previously in step 206 of FIG. 2 by the administrator and optionally the user. The authorization service 130 then sends the token to the client application 102A in step 320.

For example, assume that the network application 120A is a video conference application for a quarterly company meeting by the CEO of the company. The administrator has administered the CEO access to speak and view the meeting. Each of the employees has been granted view only privileges. In this example, if the user of the application was the CEO, the token would include information that would allow the CEO to speak in the meeting along with viewing the meeting. If the user of the application was an employee, the token would include information that indicates that the application only has viewing access to the meeting.

In response to receiving the token in step 320, the client application 102A sends an access request with the token to the network application 120A in step 322. The network application 120A sends the token to the authorization service 130 in step 324. The authorization service 130 determines if the token is valid in step 326. The reason that the token is sent to the authorization service 130 is to ensure that the token the network application 120A received in step 320 is an authentic token generated by the authorization service 130. If the token is valid in step 326, the authorization service 130 sends a message indicating that the token is valid in step 328.

The network application 120A sends an access grant message to the client application 102A in step 330. The client application 102A is granted access to the network application 120A based on the administrative access control defined in the token in step 322. The client application 102A can then access the network application 120A according the granted access control.

Figure 4:
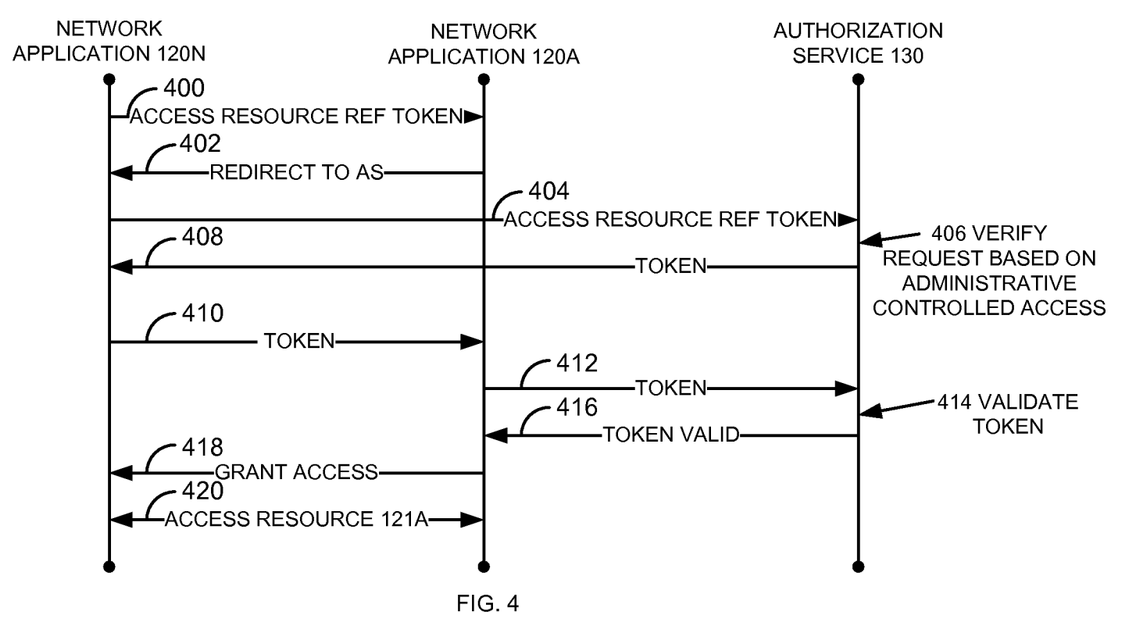
FIG. 4 is a flow diagram of a process for granting a first network application access to a second network application.

FIG. 4 is a flow diagram of a process for granting a first network application 120N access to a second network application 120A. The process starts in step 400 when the network application 120N sends an access request to the network application 120A. The access request includes a refresh token request. The refresh token request is used when the previous token has expired or is about to expire. In response to the message of step 400, the network application 120A sends a redirect message to redirect the message of step 400 to the authorization service 130 in step 402. In response to receiving the redirect message of step 402, the network application 120N sends the access resource message with the refresh token request to the authorization service 130 in step 404.

The authorization service 130 verifies what specific access control the application 120N currently has (i.e., if the application 120N's access control has changed) in step 406. In response to verifying what access control the application 120N currently has in step 406, the authorization service 130 generates a token that is based on the specific access control of the network application 120N in step 406. The access control for the network application 120N was defined previously in step 206 of FIG. 2 by the administrator and optionally the user. The authorization service 130 then sends the token to the network application 120N in step 408.

In response to receiving the token in step 408, the network application 120N sends an access request with the token to the network application 120A in step 410. The network application 120A sends the token to the authorization service 130 in step 412. The authorization service 130 determines if the token is valid in step 414. The reasons that the token is sent to the authorization service 130 is to ensure that the token the network application 120A received in step 410 is an authentic token generated by the authorization service 130. If the token is valid in step 414, the authorization service 130 sends a message indicating that the token is valid in step 416.

The network application 120A sends an access grant message to the network application 120N in step 418. The network application 120N is granted access to the network application 120A based on the administrative access control defined in the token in step 420. The client application 102A can then access the network application 120A according the granted access control.

For example, assume that the network application 120A is a voice mail application for the user and that the network application 120N is a conference recording application. The administrator has defined the user may dynamically allow any application 120 to access the user's voice mail application 120A. The user has access to the recording application 120N and decides to record a conference call. When the conference call has ended, the recording application 120N wants to place the recorded conference call in the user's voice mail. In this example, the recording application 120N makes the access request, in step 400, and receives the redirect message of step 402. The recording application 120N sends the access request to the authorization service 130 in step 404. The authorization service 130 verifies that the administrator has set that the user controls access to the voice mail application 120A in step 406. The authorization service 130 sends the token that includes the access information that the user dynamically allows access to the voice mail application 120A in step 408.

The call recording application 120N sends the token to the voice mail application 120A in step 410. The voice mail application 120A sends the token to the authorization service 130 in step 412. The authorization service 130 validates the token in step 414. The authorization service 130 sends the message that validates the token in step 416. In response to receiving the messages that validates the token in step 416, the voice mail application 120A requests, via a pop-up window, that the user approve the recording application 120N accessing the user's voice mail application 120A. The user approves the access. In response, the grant access message of step 418 is sent to the recording application 120N and the recording application 120N accesses the user's voice mail application 120A and saves the recording of the conference call in the user's voice mail.

Figure 5:
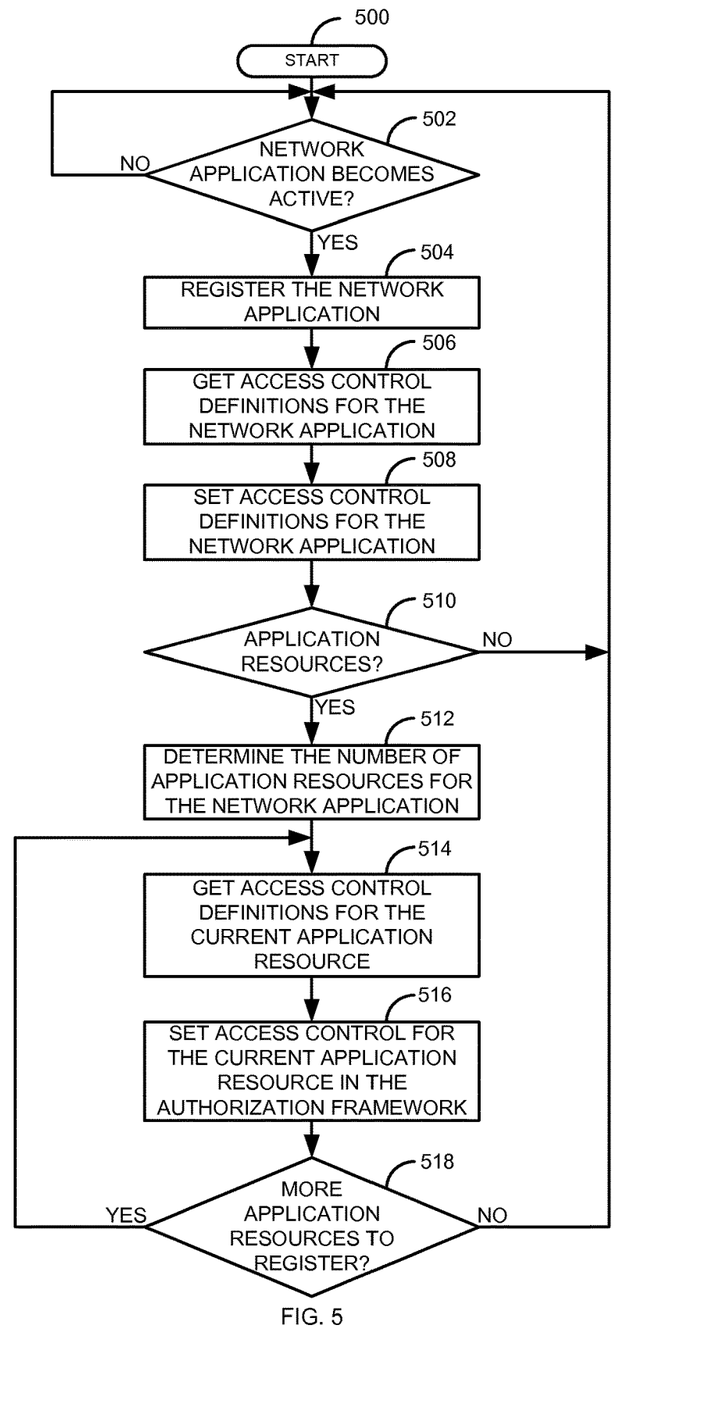
FIG. 5 is a flow diagram for setting access control when a network application becomes active.

FIG. 5 is a flow diagram for setting access control when a network application 120 becomes active. The process starts in step 500. The authorization framework 131 determines if a network application 120 has become active in step 502. The authorization framework 131 can determine if the network application 120 has become active in various ways. For example, the network application 120 can send a message (e.g., a broadcast message) to the authorization framework 131 when the network application 120 becomes active. If a network application 120 has not become active in step 502, the process repeats step 502.

Otherwise, if the network application 120 has become active in step 502, the authorization framework 131 registers the network application 120 in step 504. The authorization framework 131 gets access control definitions for the network application 120 in step 506. The access control definitions for the network application 120 are default definitions that are defined by the network application 120. The access control definitions for the network application 120 define how users or network application 120 (e.g., via administrative control) can access the network application 120. The authorization framework 131 sets the access control definitions for the network application 120 in step 508. The access control definitions may be overridden by the administrator.

The authorization framework 131 determines if the network application 120 has any application resources 121 that have individual access control in step 510. If the network application 120 does not have any application resources 121 in step 510, the process goes back to step 502.

Otherwise, if the network application 120 has application resources 121 in step 510, the authorization framework 131 determines the number of application resources 121 for the network application 120 in step 512. For example, for the network application 120A, there would be N application resources 121 (e.g., ten application resources). The authorization framework 131 gets access control definitions for the current application resource 121 in step 514. The access control definitions for the application resource 121 are default definitions that are defined by the network application 120. The access control definitions for the application resource 121 define how users and application (e.g., via administrative control) can access the application resource 121. The authorization framework 131 sets the access control for the current application resource 121 in step 516. The authorization framework 131 determines in step 518 if there are more application resources 121 to register in step 518. If there are more application resources 121 to register in step 518, the process goes to step 514. Otherwise, the process goes to step 502.

The above processes work using Hypertext Transfer Protocol (HTTP) and SAML. However, in other embodiments, other protocols may be used for transport, authentication and encryption, such as Session Initiation Protocol (SIP), Web Real-Time Protocol (WebRTC), Secure Sockets Layer, Public Key Infrastructure and/or the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving from a first application, by a microprocessor, a message to register with an authorization framework, wherein the message is sent upon the first application becoming active;
   extending, by the microprocessor, the authorization framework that allows user access control to the first application and wherein extending the authorization framework comprises dynamically adding administrative access control to the authorization framework for a plurality of separate application resources in the first application;
   receiving, by the microprocessor, a first request from a second application to get a token that controls access to the first application; and
   in response to receiving the first request from the second application to get the token that allows access to the first application, sending, by the microprocessor, the token, wherein the token identifies if the second application is allowed or not allowed to access individual ones of the plurality of separate application resources in the first application and wherein the token is defined based on the dynamically added administrative access control.

2. The method of claim 1, further comprising:
   receiving the token from the first application;
   determining if the token is valid; and
   in response to determining that the token is valid, sending an indication that the token is valid to the first application.

3. The method of claim 2, wherein the first application is a network application, the second application is a client application, and further comprising:
   sending a second request from the second application to access the first application, wherein the second request does not include the token;
   receiving, from the first application, a first redirect message that redirects the second request from the second application to an authorization service;
   sending the second request from the second application to access the first application to the authorization service;
   receiving a second redirect message redirecting the second request from the second application to access the first application to an identity management system;
   sending the second request from second application to access the first application to the identity management system;
   receiving a request to solicit a credential from a user;
   sending the credential from the user to the identity management system; and in response to the credential being valid, receiving a third redirect message that redirects a token request to the authorization service.

4. The method of claim 3, further comprising:
sending, by the second application, the token to the first application; and
receiving, by the second application, an access grant from the first application.

5. The method of claim 2, wherein the first and second applications are non-client networked applications and further comprising:
sending a second request from the second application to access the first application, wherein the second request includes a refresh token, wherein the refresh token indicates that a previous token has expired or is about to expire;
receiving, from the first application, a first redirect message that redirects the second request from the second application to an authorization service;
sending the token, from the second application to the first application; and
receiving, by the second application, an access grant from the first application.

6. The method of claim 5, wherein the administrative access control allows the user access control to dynamically decide when the second application can access the first application based on input from a pop-up window provided to a user who has rights to approve access to the first application.

7. The method of claim 1, wherein the message to register with the authorization framework is a broadcast message.

8. The method of claim 1, wherein when the first application registers with the authorization framework upon becoming active, the first application defines that the user access control can override the administrative access control.

9. The method of claim 1, further comprising:
registering, when the first application becomes active, the plurality of separate application resources with the authorization framework.

10. The method of claim 1, further comprising: generating the token, wherein the token is generated based on current access control of the plurality of separate application resources in the first application.

11. An system comprising:
a microprocessor; and
a computer readable medium, coupled with the microprocessor and comprising microprocessor readable and executable instructions that cause the microprocessor to execute:
an authorization service that extends an authorization framework, receives, from a first application, a message to register with the authorization framework, wherein the message is sent upon the first application becoming active, receives a first request from a second application to get a token, wherein the token controls access for a plurality of separate application resources in the first application, and sends the token in response to receiving the first request from the second application to get the token that allows access to the first application, wherein the token identifies if the second application is allowed or not allowed to access individual ones of the plurality of separate application resources in the first application, wherein the token is defined based on a dynamically added administrative access control, wherein the authorization framework allows user access control to the first application, and wherein extending the authorization framework comprises dynamically adding administrative access control to the authorization framework.

12. The system of claim 11, wherein the authorization service receives the token from the first application, determines if the token is valid and sends an indication that the token is valid to the first application in response to determining that the token is valid.

13. The system of claim 12, wherein the first application is a network application and the second application is a client application and wherein:
the client application sends a second request to access the first application, wherein the second request does not include the token, receives, from the first application, a first redirect message that redirects the second request to an authorization service, sends the second request to access the first application to the authorization service, receives a second redirect message redirecting the second request to access the first application to an identity management system, sends the second request to access the first application to the identity management system, receives a request to solicit a credential from a user, sends the credential from the user to the identity management system, and receives a third redirect message that redirects a token request to the authorization service in response to the credential being valid.

14. The system of claim 13, wherein the client application sends the token to the first application and receives an access grant from the first application.

15. The system of claim 12, wherein the first and second applications are non-client networked applications and wherein:
the second application sends a second request to access the first application, wherein the second request includes a refresh token, wherein the refresh token indicates that a previous token has expired or is about to expire, receives, from the first application, a first redirect message that redirects the second request to an authorization service, sends the token to the first application and receives an access grant from the first application.

16. The system of claim 15, wherein the administrative access control allows the user access control to dynamically decide when the second application can access the first application.

17. The system of claim 11, wherein the administrative access control is administered to allow the second application to access the first application.

18. The system of claim 11, wherein when the first application registers with the authorization framework upon becoming active, the first application defines that the user access control can override the administrative access control.

19. The system of claim 11, wherein:
when the first application registers with the authentication framework, when the first application becomes active, the plurality of separate application resources with the authorization framework, wherein the first application defines separate access control for each of the plurality of separate application resources.

20. A method comprising:
extending, by a processor, an authorization framework that allows user access control to a voicemail application and wherein extending the authorization framework comprises dynamically adding administrative access control to the authorization framework;

in response to a conference call ending, receiving, by the processor, a request from a recording application to get a token that controls access to the voicemail application; and in response to receiving the request from the recording application to get the token that allows access to the voicemail application, sending, by the processor, the token, wherein the token identifies if the recording application is allowed or not allowed to access the voicemail application for saving a recording of the conference call and wherein the token is defined based on the dynamically added administrative access control.

* * * * *